United States Patent [19]

Janssen et al.

[11] 3,711,636

[45] Jan. 16, 1973

[54] AUTOMATIC CONTRAST CONTROL CIRCUIT FOR A TELEVISION RECEIVER

[75] Inventors: Peter Johannes Hubertus Janssen; Leonardus Adrianus Johannes Verhoeven, both of Emmasingel, Eindhoven, Netherlands

[73] Assignee: U.S. Philips Corporation, New York, N.Y.

[22] Filed: June 9, 1971

[21] Appl. No.: 151,585

Related U.S. Application Data

[63] Continuation of Ser. No. 806,892, March 13, 1969, abandoned.

[30] Foreign Application Priority Data

March 26, 1968 Netherlands ........................6804264

[52] U.S. Cl...........178/5.4 R, 178/7.3 R, 178/7.3 DC

[51] Int. Cl...........H04n 5/20, H04n 5/58, H04n 9/48

[58] Field of Search........178/7.3 DC, 7.5 DC, 7.3 R, 178/7.5 R, 5.4 R

[56] References Cited

UNITED STATES PATENTS

| | | | |
|---|---|---|---|
| 3,009,989 | 11/1961 | Ahrons et al. | 178/5.4 |
| 3,072,741 | 1/1963 | Ahrons et al. | 178/7.5 |
| 3,179,743 | 4/1965 | Ahrons et al. | 178/5.4 |
| 3,465,095 | 9/1969 | Hansen et al. | 178/5.4 |

*Primary Examiner*—Robert L. Richardson
*Attorney*—Frank R. Trifari

[57] ABSTRACT

An automatic contrast control circuit features a transistor emitter coupled differential amplifier which has a luminance or chrominance signal applied to it. A circuit generates an automatic gain control voltage which is also applied to the differential amplifier. The gain of the amplifier can be adjusted to any value while still enabling linear amplification of the input signal. The sync signal amplitude is not affected.

8 Claims, 2 Drawing Figures

Figure 1:
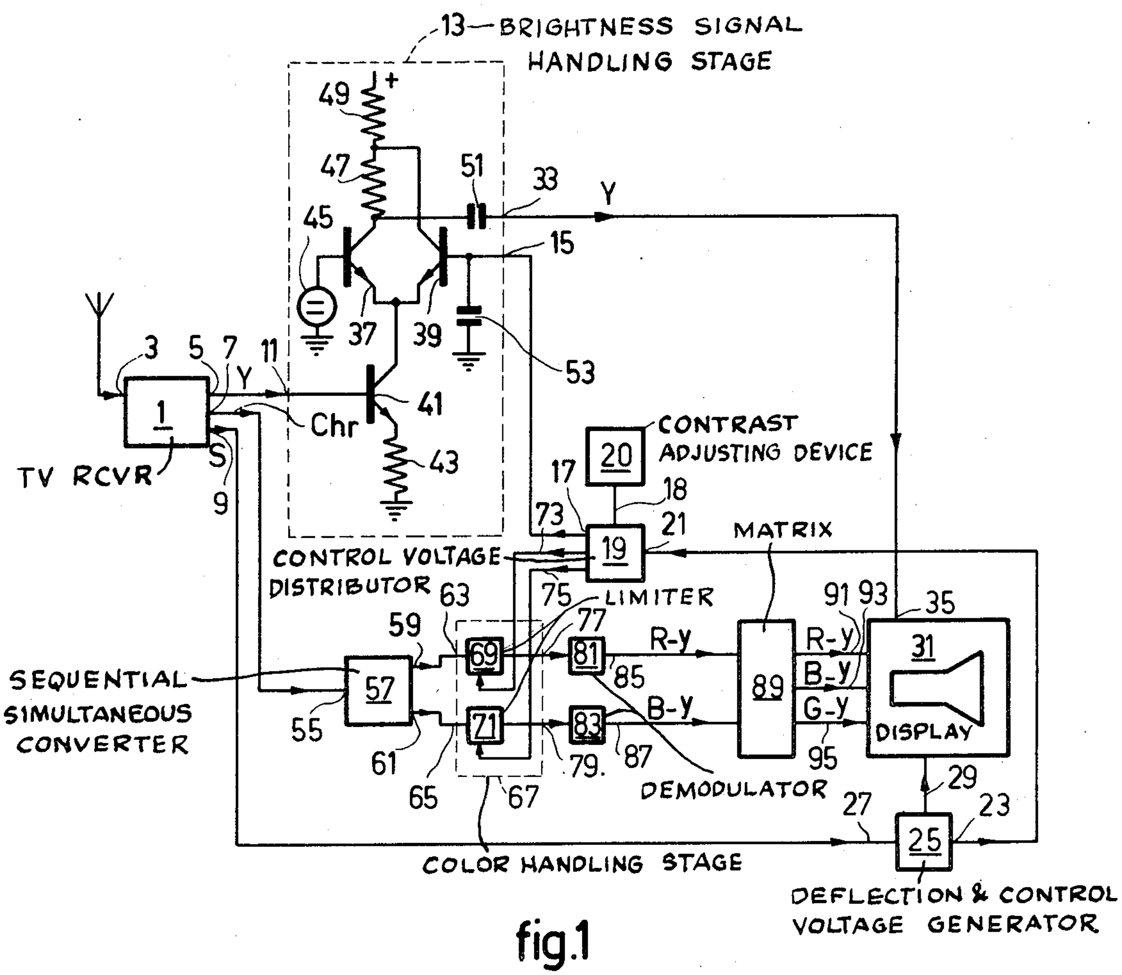

INVENTORS
PETER J.H.JANSSEN
LEONARDUS A.J.VERHOEVEN
BY
AGENT

INVENTORS
PETER J.H.JANSSEN
LEONARDUS A.J.VERHOEVEN
BY
Frank R. Trifari
AGENT

AUTOMATIC CONTRAST CONTROL CIRCUIT FOR A TELEVISION RECEIVER

This case is a continuation of application Ser. No. 806,892, filed Mar. 13, 1969, and now abandoned the priority of which is hereby claimed.

The invention relates to a television receiver comprising a device for generating a beam current limiting voltage, a luminance signal handling stage having a first input for supplying a video frequency luminance signal to be handled, a second input for supplying the beam current limiting voltage connected to an output of the device for generating the beam current limiting voltage, and an output for deriving a luminance signal which can be influenced by the beam current limiting voltage. The luminance signal handling stage showing a substantially linear relationship between a video frequency luminance signal which is supplied to the first input and which can be derived from the output.

A television receiver of the above-described type is known from Radiomentor 9, 1967, pp. 700–701 in which a beam current limiting voltage in the luminance signal handling stage is added to the luminance signal. The said luminance signal handling stage of this known receiver is d.c. coupled to the picture tube, so that a variation of the beam current limiting voltage results in a variation of the back-ground brightness on the picture tube. This known receiver furthermore comprises an IF amplifier to a control input of which a beam current limiting voltage is also supplied. When the beam current of the picture tube is too large, the contrast in the picture to be reproduced is controlled to a lower value.

The drawbacks of a beam current limiting system of a type as described above are as follows:

The black level of the reproduced picture is dependent upon contrast. The output voltage of the IF-amplifier is not constant, so that the video detector, particularly in transistorized receivers, is not always sufficiently driven, and the amplitude of the synchronization pulses are not constant. The insufficient driving of the video detector results in it operating in a non-linear region. The non-constant condition of the amplitude of the synchronization pulses can produce an instability of the picture in the case of a large drive of the picture tube and consequently small amplitude of the synchronization pulses caused by the beam current limiting system. Furthermore the synchronization signal separating device must be suitable for a large amplitude range of the presented signal which imposes high requirements upon said device.

It is the object of the invention to avoid the said drawbacks.

According to the invention, a television receiver of the type mentioned in the preamble is characterized in that the luminance signal handling stage comprises means for obtaining an amplitude ratio between the video frequency luminance signal at the output and at the first input of the luminance signal handling stage which can be influenced by the beam current limiting voltage applied to the second input while the luminance signal handling stage remains substantially linear at any amplitude ratio.

The invention is based on the recognition of the fact that the above-mentioned drawbacks can be prevented when the output voltage of the IF amplifier can be made independent of the beam current, so that the contrast control dependent upon the beam current takes place after the IF amplifier in a signal handling stage, the output voltage of which is influenced and the linearity of which is not influenced by a control voltage which depends upon the beam current and is supplied thereto. Such a signal handling stage can be formed, for example, by means of a pentode controlled at the suppressor grid and excited at the control grid, furthermore, for example, with a so-called beam deflection pentode, a heptode, two diodes compensating for the non-linearity of each other, or an emitter-coupled transistor differential amplifier.

In order that the invention may be readily carried into effect, two examples thereof will now be described in detail, by way of example, with reference to the accompanying drawings, in which FIG. 1 shows a simplified block diagram of a television receiver having a beam current limiting device according to the invention, suitable for handling a SECAM color television signal.

Figure 2:
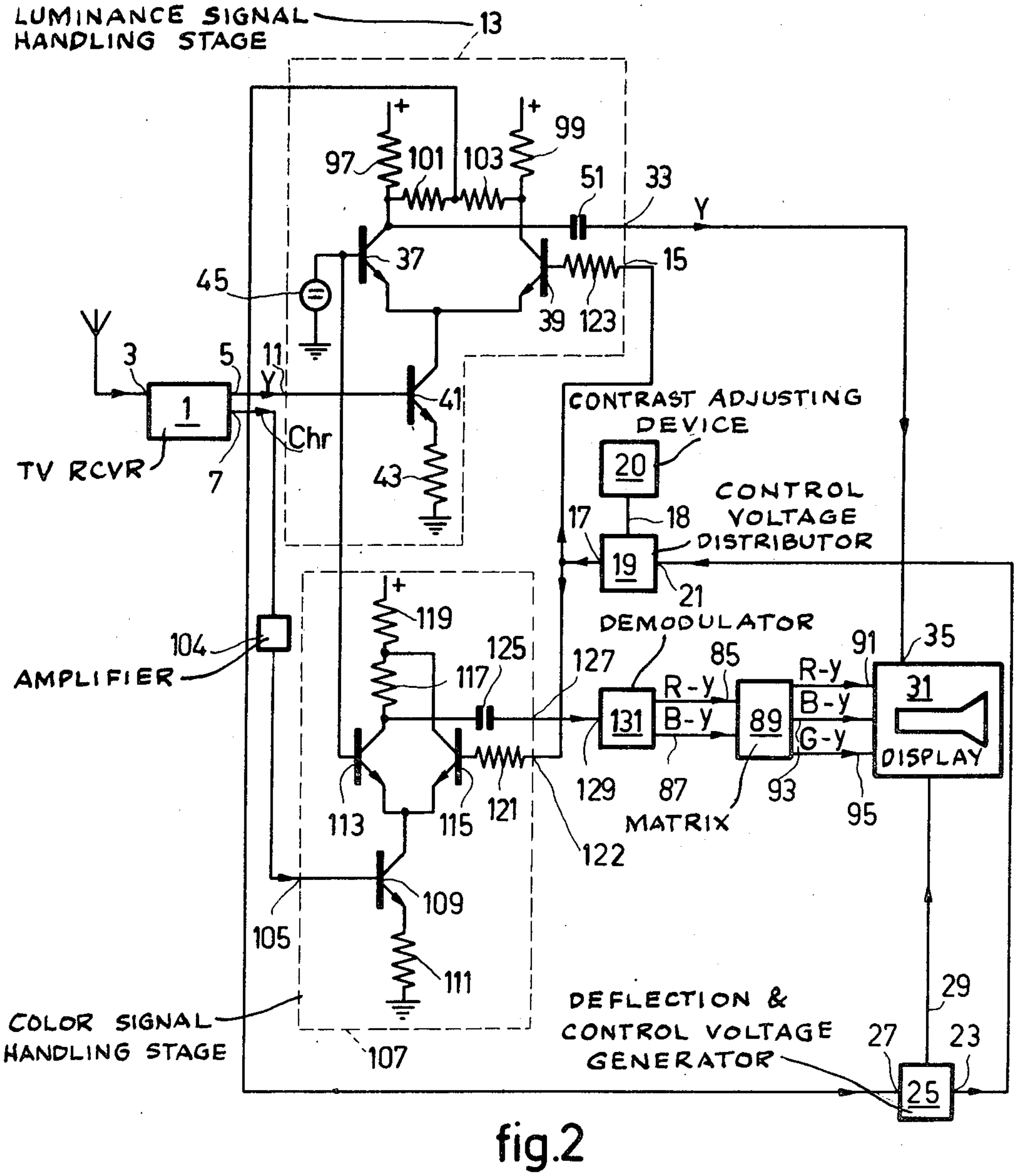

FIG. 2 shows a simplified block diagram of a television receiver having a beam current limiting device according to the invention, suitable for handling an NTSC or a PAL color television signal.

Referring now to FIG. 1, a part 1 of the receiver comprises an input 3 to which a received television signal can be applied. When a color television signal is received, this signal is converted, for example, in a known manner in the part 1 into a luminance signal Y, a chrominance signal Chr and a synchronization signal S. The luminance signal Y becomes available at an output 5 of the part 1, the chrominance signal Chr at an output 7 and the synchronization signal S at an output 9.

The output 5 is connected to a first input 11 of a brightness signal handling stage 13.

The brightness signal handling stage 13 comprises a second input 15 which is connected, through an output 17 of a distributor 19 and an input 21 thereof, to an output 23 of a device 25 for generating a beam current limiting voltage. The distributor 19 is coupled, through a number of lines diagrammatically shown in the Figure by the connection 18, to a contrast and saturation adjusting device 20. The beam current limiting voltage can be obtained, for example, in a known manner from a high-voltage generator coupled to a horizontal deflection device, which generator is also incorporated in the device 25. For that purpose, the device 25 receives a synchronization signal S through an input 27 connected to the output 9 of the part 1. The device 25 furthermore supplies deflection currents to a picture reproducing part 31 through a number of connections shown diagrammatically in the FIG. by 29.

The luminance signal handling stages 13 furthermore comprises an output 33 which is connected to an input 35 of the picture reproducing part 31 for supplying a luminance signal thereto. This luminance signal which becomes available at the output 33 can be influenced by means of the beam current limiting voltage applied to the second input 15. According to the invention the luminance signal handling stage 13 comprises for that purpose means for obtaining an amplitude ratio between the video frequency luminance signal Y appearing at the output 33 and the one supplied to the first input 11, which ratio can be influenced by the beam current limiting voltage applied to the second input 15. The linear action of said luminance signal handling stage 13 remains independent of the applied beam current limiting voltage.

According to an elaboration of the invention, an emitter-coupled differential amplifier provided with two transistors 37 and 39 is present for that purpose in the luminance signal handling stage 13. The coupled emitters thereof are supplied by the current source circuit, formed by means of a transistor 41, with the luminance signal supplied to the base of the transistor 41 through the first input 11. The collector of the transistor 41 is for that purpose connected to the emitters of the transistors 37 and 39. The emitter of the transistor 41 is connected to ground through a resistor 43. The base of the transistor 37 is connected to ground through a reference voltage source 45. The collector of the transistor 37 is connected, through a series circuit of two load resistors 47 and 49, to a supply voltage source not shown. The collector of the transistor 39 is connected to the junction of the resistors 47 and 49. The resistor 49, according to a further elaboration of the invention forms a coupling impedance through which the transistor 39 is connected to the load impedance 47, 49 of the transistor 39. This coupling impedance 49 has a linearizing influence in addition to an effect to be described hereinafter. The collector of the transistor 37 is connected to the output 33 of the luminance signal handling stage 13 through a capacitor 51. The base of the transistor 39 is connected to the second input 15 of the brightness signal handling stage 13 and is connected to ground through a capacitor 53 for any applied alternating voltage.

The output 7 of the part 1 is coupled to an input 55 of a sequential to simultaneous converter 57. In this converter 57, the chrominance signal which in the SECAM system comprises alternately one line of information regarding the red color difference signal modulated on a subcarrier and the next line regarding the blue color difference signal, is converted into a red or blue color difference signal modulated on the sub-carrier wave and always occurring simultaneously at the output 59 or 61. The outputs 59 and 61 may be connected to inputs 63 and 65, respectively, of a color signal handling stage 67. The color signal handling stage 67 according to a further elaboration of the invention comprises two limiter circuits 69, 71 to each of which is supplied a beam current limiting voltage of the distributor 19, through connections 73 and 75, respectively. According to the invention, the limiting level of the limiter circuits 69 and 71 depends upon the beam current limiting voltage. The limiter circuit 69 comprises an output 77 which is also the input of a demodulator circuit 81. An output 79 of the limiter circuit 71 is also the input of a demodulator circuit 83. Outputs of said demodulator circuits 81, 83 are connected to inputs of a matrix circuit 89 through connections 85, 87. Demodulated red and blue color difference signals, respectively, are applied to the matrix circuit 89 through the connections 85 and 87. In the matrix circuit 89 a green color difference signal is composed from the blue and red color difference signals. The green color difference signal is applied, through a connection 96, to the picture reproduction part 31, the red and blue color difference signals through connections 91 and 93.

The operation of the television receiver, in as far as it is of importance for understanding the invention, will now be described in detail below.

A luminance signal Y applied to the input 11 of the luminance signal handling stage 13 is applied to the base of the transistor 41. The collector current of the transistor 41 depends upon this luminance signal, namely substantially linearly with a correct drive of said transistor 41. This collector current is applied to the common emitters of the transistors 37 and 39. A part of the collector current of the transistor 41 flows through each of these transistors. This part is dependent upon the voltage difference between the bases of the two transistors 37 and 39, that is to say, between the voltage supplied by the voltage source 45 and the beam current limiting voltage supplied through the input 15. As a result of this distribution, the current of the collector resistor 47 is a part of the collector current of the transistor 41 determined by the beam current limiting voltage, so that a luminance signal voltage is formed across said collector resistor 47, the amplitude of which depends upon the beam current limiting voltage applied to the input 15. Under the influence of this, said amplitude may vary from zero to the product collector current transistor 41 times resistor 47 ($Ic$ 41 × R 47). The total collector current of the transistor 41 further flows through the resistor 49, so that across said resistor a voltage is formed which is independent of the beam current limiting voltage. At the collector of the transistor 37 the sum of the voltages across the resistors 47 and 49 is formed. So this is a voltage which always shows a substantially linear relationship with the luminance signal supplied to the first input 11 and the amplitude of which depends upon the beam current limiting voltage applied to the second input 15, and which may vary from a minimum value $Ic$ 41 × R 49 to a maximum $Ic$ 41 (R 47 + R 49). This voltage is applied for reproduction to the picture reproducing part 31. The beam current limiting voltage at the second input 15 originates from the output 17 of the distributor 19 to which is applied a beam current limiting voltage through an input 21 connected to the output 23 of the beam current generator 25, and a voltage which is adjustable with the contrast and saturation adjusting device 20 through the connection 18.

Therefore, besides being dependent upon the beam current, the beam current limiting voltage at the second input 15 is also dependent on the contrast adjusting device 20 which can be operated by the user. When the contrast adjusting device 20 of the receiver is operated, a minimum luminance signal voltage always remains available at the collector of the transistor 37, so that the picture reproduced by means of this cannot entirely disappear. This is of great importance for an inexpert user of the receiver, because he will see a picture in any position of the contrast adjusting member and does not get the impression that the receiver is out of order.

The signal originating from the collector of the transistor 37 is applied in this embodiment to the picture reproducing part 31, through a capacitor 51, so that again the reference level of the luminance signal has to be established. This, and any further amplification which may be required, may be effected, for example, in known manner.

It is further possible to make the direct current component of the signal at the collector of the transistor 37 independent of the beam current and of the contrast adjustment This may be done by the parallel arrangement of a second emitter-coupled differential amplifier with that of the luminance signal handling stage 13. This second differential amplifier must then be controlled at its coupled emitters by a current source which supplies only a direct current component corresponding to a reference direct current component in the luminance signal applied to the emitters of the transistors 37 and 39. This second differential amplifier must furthermore be controlled in the opposite sense as compared with the differential amplifier of the luminance signal handling stage B, by the beam current limiting voltage applied to the second input 15. In that case a direct current coupling is possible with the picture reproducing part 31. The capacitor 51 may then be omitted.

The use of the linear luminance signal handling stage 13 controllable by the beam current according to the invention provides the advantage, that the beam current exerts no influence on the part 1 and hence does not influence, for example, the synchronization signal S at the output 9 thereof, and hence the stability of the reproduced picture. The circuits for handling this synchronization signal can now easily be designed.

The part 1 furthermore comprises in general an intermediate frequency amplifier and a video detector, in which as a result of the use of the luminance signal handling stage according to the invention, the intermediate frequency amplifier is not influenced by the beam current limiting voltage, and hence the signal presented to the detector is independent in value of the beam current. This provides the great advantage that the voltage presented to the detector can always be sufficiently large for the detector to be operated in the linear part of its characteristic, which is of particular importance for transistorized receivers which usually present a comparatively low voltage for handling to the video detector.

When a color television signal is received, a color signal furthermore appears at the output 7 of the part 1 which signal contains in successive lines alternately a red and blue color difference signal modulated in frequency on a sub-carrier. This color difference signal is converted in the sequential to simultaneous converter 57 into simultaneously occurring red and blue color difference signals modulated in frequency on the sub-carrier, which signals are each applied to a limiting stage 69 and the color signal handling stage 67, respectively. According to a further elaboration of the invention, the level at which the limiting stages 69 and 71 limit, can be controlled by means of a beam current limiting voltage. The beam current limiting voltages required for that purpose are derived from the distributor 19 through the connections 73 and 75. The level at which a limiting stage 69 or 71 limits, determines the amplitude of the signal presented to the color difference signal demodulator 81 or 83 and hence the amplitude of the color difference signals modulated by said modulators and applied to the picture reproducing device 31 through the matrix device 89. The distributor 19 is preferably constructed so that the beam current limiting voltages applied to the limiters 69 and 71 through the connections 73 and 75 are adapted to each other and to the beam current limiting voltage originating from the output 17 and applied to the luminance signal handling stage 15, so that at any beam current a ratio occurs between the luminance signal and the color difference signal which remains the same.

The beam current limiting voltages applied to the limiter stages 69 and 71 are furthermore dependent, as also the beam current limiting voltage applied to the luminance signal handling stage 13, on the adjustment of the contrast and saturation adjusting device 20, so that the saturation of the reproduced color is also always adapted to the contrast of the picture.

In the above-described embodiment the synchronization signal S was obtained from the signal circuit prior to the luminance signal handling stage 13. However, it is possible to derive the synchronization signal S from the luminance signal handling stage 13, while nevertheless the amplitude thereof is not influenced by the beam current limiting voltage. For that purpose the synchronization signal S may be derived from a signal derived from the coupling impedance 49, so from the junction between the resistors 47 and 49. If for some reason or other the synchronization signal must nevertheless vary slightly with the beam current, it may be derived, for example, from a signal derived from a tap on the resistor 47.

The generation of the beam current limiting voltage in the device 25 and the construction of the distributor 19 coupled to the contrast and saturation adjusting device 20, has not been further described above. This is not essential for the invention and may be carried out, for example, in any known manner.

In FIG. 2, corresponding components have been given the same reference numerals as in FIG. 1, which is why reference is made to FIG. 1 for the description thereof.

The difference of the receiver shown in FIG. 2 with respect to that shown in FIG. 1 are as follows:

The luminance signal handling stage 13 is constructed somewhat differently from that shown in FIG. 1. The transistors 37 and 39 each have a resistor 97 and 99, respectively, as a load impedance which is connected between their collector and a supply source. The collectors are connected through a series circuit of two resistors 101 and 103 serving as a coupling impedance. The proportioning of the resistors 97, 99, 101, 103 determine the ratio between the maximum and the minimum amplitude, which a luminance signal applied through the input 11 of the collector of transistor 37 can assume under the influence of the beam current limiting voltage at the second input 15.

Furthermore the input 27 of the device for generating the beam current limiting voltage 25 is connected to a tap on the coupling impedance 101, 103. This tap may be chosen or adjusted so that the signal applied to the input 27 is substantially independent in amplitude of the beam current limiting voltage applied to the second input 15 of the luminance signal handling stage 13. The synchronization signal to be derived from the signal applied to the input 27 in that case also is independent of the beam current limiting voltage at the second input 15.

The output 7 of the part 1 is connected, through a chrominance signal amplifier 104, to a first input 105 of a color signal handling stage 107 for applying the chrominance signal $CH_r$ thereto. This color signal handling stage 107 is constructed in the same manner as the luminance signal handling stage 13 described with reference to FIG. 1. A transistor 109 serving as a current source has its base connected to the first input 105 and its emitter to ground through a resistor 111. The collector is connected to the emitters of two transistors 113 and 115. The base of the transistor 113 is connected to the reference voltage source 45 and that of the transistor 115 is connected to the output 17 of the distributor 19 through a resistor 121 and a second input 122. The resistor 121 is large with respect to the internal base resistance $r_{bb'}$ of the transistor 113 and substantially equal to a resistor 123 which is incorporated between the second input 15 of the luminance signal handling stage 13 and the base of the transistor 39 therein. As a result of these resistors 121 and 123 a very good synchronization of the stages 107 and 113 is obtained upon adjustment through the beam current limiting voltage originating from the output 17 and applied to the second inputs 102 and 15. The output signal of the color signal handling stage 107 is applied from the collector of the transistor 113 to an input 129 of a demodulator device 131 through a capacitor 125 and an output 127. This output signal has an amplitude the ratio of which to the amplitude of the brightness signal at the output 33 of the brightness signal handling stage 13 is substantially independent of the beam current limiting voltage at the output 17.

From the junction of the resistors 117 and 119, furthermore the color synchronization signal can be obtained from the chrominance signal, for example through a gate. The color synchronization signal at this place has an amplitude which is independent of the beam current limiting voltage and may be used, for example, for automatic gain control of the chrominance amplifier 104.

In the demodulating device 131 the chrominance signal is demodulated and color difference signals (R–Y) and (B–Y) are obtained which are applied to the matrix circuit 89 through the connections 85 and 87.

The examples described related to color television receivers. It will be obvious that the beam current limitation of the invention is also of importance for a black-and-white receiver.

In the example described, the beam current limitation in the color signal part was carried out at a place where the signal was not yet demodulated. Of course, it is alternatively possible, for example, to control with the luminance signal the demodulated color difference signals, instead of the non-demodulated color difference signals, by means of the linearly operating stages influenced by the beam limiting current. Furthermore it is possible first to compose the luminance signal with the color difference signal and then, for example, to handle the resulting R, G and B-signals, each through a linear control stage. The beam current limitation may alternatively take place in a stage connected after the video detector, through which the luminance signal and the nondemodulated color signal are conveyed.

What is claimed is:

1. A circuit for processing a signal having luminance and synchronization components, said circuit comprising means for generating a beam current and a control voltage having an amplitude determined by the amplitude of said beam current first; means for linearly amplifying said luminance component regardless of the degree of amplification including an amplifier having input, output, and an amplification control terminals, said input terminal being coupled to receive said luminance component, said amplification control terminal being coupled to receive said control voltage, and said output terminal supplying a linearly amplified version of said luminance component regardless of the value of said control voltage; and means for deriving said synchronization component at a constant amplitude regardless of the value of said control voltage.

2. A circuit as claimed in claim 1 wherein said signal further comprises a chrominance component and said circuit further comprising second means for linearly amplifying a signal regardless of the degree of amplification including a second amplifier having input, output, and amplication control terminals, said input terminal being coupled to receive said chrominance signal, said control terminal being coupled to receive said said control voltage, and said output terminal supplying a linearly amplified version of said chrominance signal regardless of the value of said control voltage.

3. A circuit as claimed in claim 1 further comprising means for manually adjusting the amplification of said amplifier.

4. A circuit as claimed in claim 1 wherein said amplifier comprises a transistor emitter coupled differential amplifier and a current source coupled to said coupled emitters and to said input terminal.

5. A circuit as claimed in claim 4 further comprising a second amplifier comprising a second emitter coupled differential amplifier having an input terminal coupled to receive a chrominance signal, an output terminal for supplying said chrominance signal, and amplification control terminal; and means for coupling both of said control terminals to said control voltage generating means, said coupling means having a resistance substantially higher than the input resistance of said control terminals.

6. A circuit as claimed in claim 4 wherein said amplifier comprises a first and second transistor each having emitter, base, and collector electrodes; first and second load impedances coupled to said first and second collectors respectively, said output terminal being coupled to said first collector, and a coupling impedance coupled between said first and second collectors.

7. A circuit as claimed in claim 6 wherein said deriving means comprises a time base generator having an input coupled to said coupling impedance.

8. A circuit as claimed in claim 2 wherein said second linear amplifying means further comprises a limiter stage coupled to receive said control voltage.

* * * * *